(12) United States Patent
George et al.

(10) Patent No.: US 6,996,566 B1
(45) Date of Patent: Feb. 7, 2006

(54) METHOD AND SYSTEM FOR AN OBJECT MODEL WITH EMBEDDED METADATA AND MAPPING INFORMATION

(75) Inventors: Joseph Mulavelil George, Austin, TX (US); Piotr Krychniak, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/717,809

(22) Filed: Nov. 21, 2000

(51) Int. Cl.
 *G06F 17/30* (2006.01)
(52) U.S. Cl. .................................. 707/100; 707/103 Y
(58) Field of Classification Search ............ 707/103 R, 707/100, 103 Y, 103 Z
 See application file for complete search history.

(56) References Cited

U.S. PATENT DOCUMENTS

| | | | |
|---|---|---|---|
| 5,133,068 A | 7/1992 | Crus et al. ................... 707/100 |
| 5,551,029 A | 8/1996 | Jagadish et al. ......... 707/103 R |
| 5,560,005 A | 9/1996 | Hoover et al. ................ 707/10 |
| 5,590,322 A | 12/1996 | Harding et al. ................. 707/4 |
| 5,604,892 A | 2/1997 | Nuttall et al. ................. 703/18 |
| 5,630,092 A | 5/1997 | Carreiro et al. ............. 711/111 |
| 5,724,575 A | 3/1998 | Hoover et al. ................ 707/10 |
| 5,809,507 A * | 9/1998 | Cavanaugh, III ....... 707/103 R |
| 5,819,086 A | 10/1998 | Kroenke ...................... 707/102 |
| 5,819,254 A | 10/1998 | Kawai ............................. 702/2 |
| 6,035,303 A * | 3/2000 | Baer et al. .............. 707/103 R |
| 6,122,641 A * | 9/2000 | Williamson et al. .... 707/103 R |
| 6,418,448 B1 * | 7/2002 | Sarkar ...................... 707/104.1 |
| 6,484,180 B1 * | 11/2002 | Lyons et al. ............ 707/103 R |
| 6,539,388 B1 * | 3/2003 | Hattori et al. ............... 707/101 |

OTHER PUBLICATIONS

"Using a Semantic Network to Describe Transaction Objects", IBM Technical Disclosure Bulletin, v. 39, n. 1, pp. 391-392, Jan. 1996.

* cited by examiner

*Primary Examiner*—Greta Robinson
(74) *Attorney, Agent, or Firm*—Jeffrey S. LaBaw; Joseph R. Burwell

(57) ABSTRACT

Metadata is obtained from a database and provided to an object model that uses the database for persisting the state of its objects. The metadata provides the object model with constraints, size limits, or other limiting information about a database so that the object model can anticipate and handle potential errors that could occur at the database level. Rather than keeping the metadata embedded within the database, the object model obtains access to the metadata and can adopt policies for dealing with those constraints and limits. In addition, the object model is also provided with heuristics that can be applied to storage processing of attributes. In this manner, the object model becomes metadata-aware and can handle database operations more intelligently and thus propagate fewer errors to the client.

27 Claims, 7 Drawing Sheets

```
Java Class Definition
class Author {
    private String m_author_id;
    private String m_author_name;
    private String m_url;
    private String m_description;
}
```
600

610
```xml
<MappingRecord classname="Author" >
    <TableName> AUTH_TABLE </TableName>
    <Attribute position="1">
        <ClassField type= "String"> m_author_id </ClassField>
        <DBField> AUTHOR_ID </DBField>
        <Truncatable> NO </Truncatable>
    </Attribute>
    <Attribute position="2">
        <ClassField type= "String"> m_author_name</ClassField>
        <DBField> NAME </DBField>
        <Truncatable> NO </Truncatable>
    </Attribute>
    <Attribute position="3">
        <ClassField type= "String"> m_url</ClassField>
        <DBField> URL </DBField>
        <Truncatable> NO </Truncatable>
    </Attribute>
    <Attribute position="4">
        <ClassField type= "String"> m_description</ClassField>
        <DBField> DESCRIPTION </DBField>
        <Truncatable> YES </Truncatable>
    </Attribute>
</MappingRecord>
```

*FIG. 6B*

620
```xml
<Table name="AUTH_TABLE" numattributes="4">
 <PrimaryKey>
  <Field name="AUTHOR_ID" pos="1">
        <Type> VARCHAR2 </Type>
        <Nullable> FALSE </Nullable>
        <Length> 20 </Length>
  </Field>
 </PrimaryKey>
 <Field name="NAME" pos="2">
        <Type> VARCHAR2 </Type>
        <Nullable> FALSE </Nullable>
        <Length> 40 </Length>
 </Field>
 <Field name="URL" pos="3">
        <Type> VARCHAR2 </Type>
        <Nullable> FALSE </Nullable>
        <Length> 1024 </Length>
 </Field>
 <Field name="DESCRIPTION" pos="4">
        <Type> VARCHAR2 </Type>
        <Nullable> FALSE </Nullable>
        <Length> 512 </Length>
 </Field>
</Table>
```

*FIG. 6C*

METHOD AND SYSTEM FOR AN OBJECT MODEL WITH EMBEDDED METADATA AND MAPPING INFORMATION

CROSS-REFERENCE TO RELATED APPLICATIONS

The present application is related to the following applications: application Ser. No. 09/544,274, filed Apr. 6, 2000, titled "Apparatus and Method for Deletion of Objects From an Object-Relational System in a Customizable and Database Independent Manner"; and application Ser. No. 09/717,818, filed Nov. 21, 2000, titled "Method and system for a generic metadata-based mechanism to migrate relational data between databases".

BACKGROUND OF THE INVENTION

1. Field of the Invention

The present invention relates to an improved data processing system and, in particular, to a method and system for using a database. Still more particularly, the present invention provides a method and system for using an object-oriented software program.

2. Description of Related Art

In an object-oriented application, the relationships and behavior among objects are defined in accordance with an object model. Depending upon the use of the objects and the desired level of persistence, the object-oriented application may store the objects within a relational database in which the state of the objects are stored as records in a relational database table and in which object attributes are mapped to columns within the relational database tables.

Databases have constraints that limit the operations that may be performed on the stored object representations within the database by an object-oriented application. For example, there are foreign-key constraints, or dependency constraints, in the relational database that ensure the integrity of the data. When a data representation of an object is deleted from the relational database, the deletion of the underlying database record must abide by the database constraints so that if there are any dependencies, the deletion must be handled accordingly. As another example, a database may have specific data field size limitations that prevent objects that exceed the size limit from being stored within the database.

Database constraints and data type size limits are some of the common exception cases that developers need to address in object models that store their data in databases. When the state of one or more objects are persisted into the database, the stored data must conform to those constraints. However, the object classes and their instances defined by an object model generally lack sufficient information about those database constraints and size limits because the knowledge of the database constraints and size limits is expressed outside of the domain of the object model, e.g., in the relational database schema definition if a relational database is used to store the state of the object model.

As a result, the clients of the object model cannot query the object model to learn about the constraints and size limits. When an object is stored in the database, the database may generate an error if a constraint or size limit is exceeded. The objects in an object model may be expected to handle the database errors at the time their state is stored, but because the objects lack any knowledge of appropriate policies to deal with those kind of errors, the errors are passed to the clients of the object model. It would be beneficial if the objects could handle these errors themselves in a well-behaved and consistent manner.

The clients of an object model would also benefit from objects having knowledge of predefined policies that should be adopted when some of the database constraints are violated or size limits are exceeded. For example, the semantics of certain attributes of an object may allow for the attributes to be truncated, such as those of a descriptive nature, while other attributes have to be stored intact to be meaningful.

Therefore, it would be advantageous to provide a method and system for allowing an object model to be aware of the database constraints and size limitations as well as capable of using semantic information about attributes to adopt policies for dealing with those constraints and limits.

SUMMARY OF THE INVENTION

A method, system, apparatus, and computer program product are presented for storing object attribute data in a database. Metadata is retrieved from the database, e.g., by querying the database; the metadata includes information about database limitations, such as record constraints, field constraints, and/or size limits. The database may be a relational database in which object attributes correspond with columns of relational tables. Semantic information is retrieved from a mapping repository; the semantic information indicates a manner in which object attribute data is stored in the database, such as by providing a mapping between object attributes and records in a relational database. The metadata and the semantic information can be transformed into or stored in XML-formatted documents. The object attribute data is stored in the database according to the semantic information and the metadata. If the object attribute data has characteristics that conflict with the database limitations indicated within the retrieved metadata, then the object attribute data can be modified so that the object attribute data does not have characteristics that conflict with the database limitations, and the modified object attribute data can then be stored into the database without error. Heuristic information can also be used to modify the object attribute data in accordance with system policies. The metadata and the semantic information can be retrieved during an initialization phase of an object model that uses the metadata on behalf of clients of the object model.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5 is a diagram that depicts the data flow between the object model, the database, and other components of the present invention;

FIGS. 6A–6C are a set of diagrams that provide mapping and semantic information, metadata information, and heuristic information in an XML-formatted manner for use by an object model;

DETAILED DESCRIPTION OF THE INVENTION

Figure 1A:
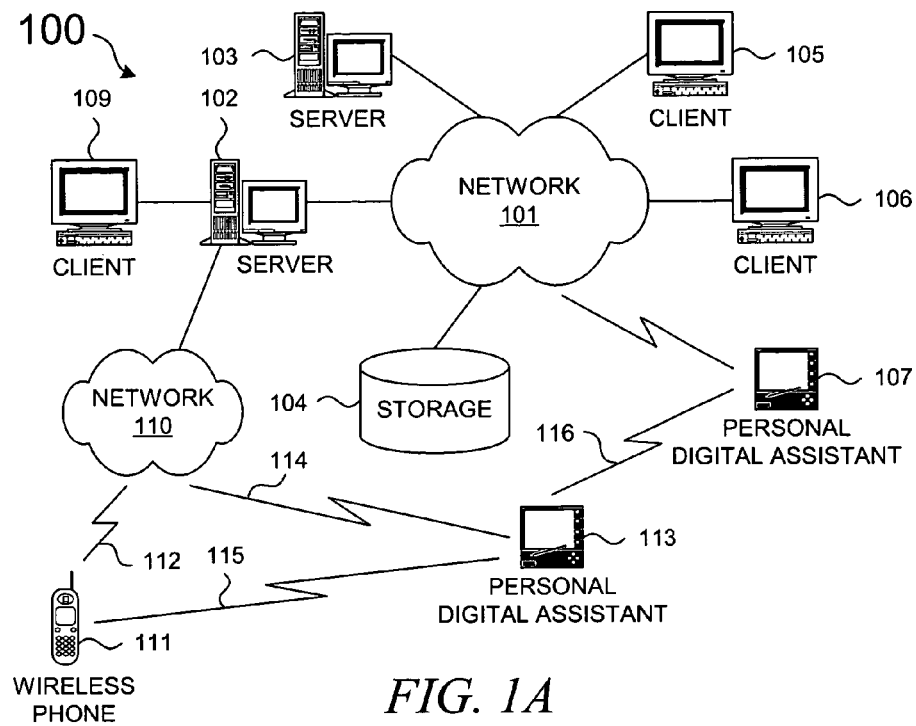
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP, TCP/IP, HTTP, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 117 via wireless communication link 116.

The present invention could be implemented on a variety of hardware platforms; FIG. 1A is intended as an example of a heterogeneous computing environment and not as an architectural limitation for the present invention.

Figure 1B:
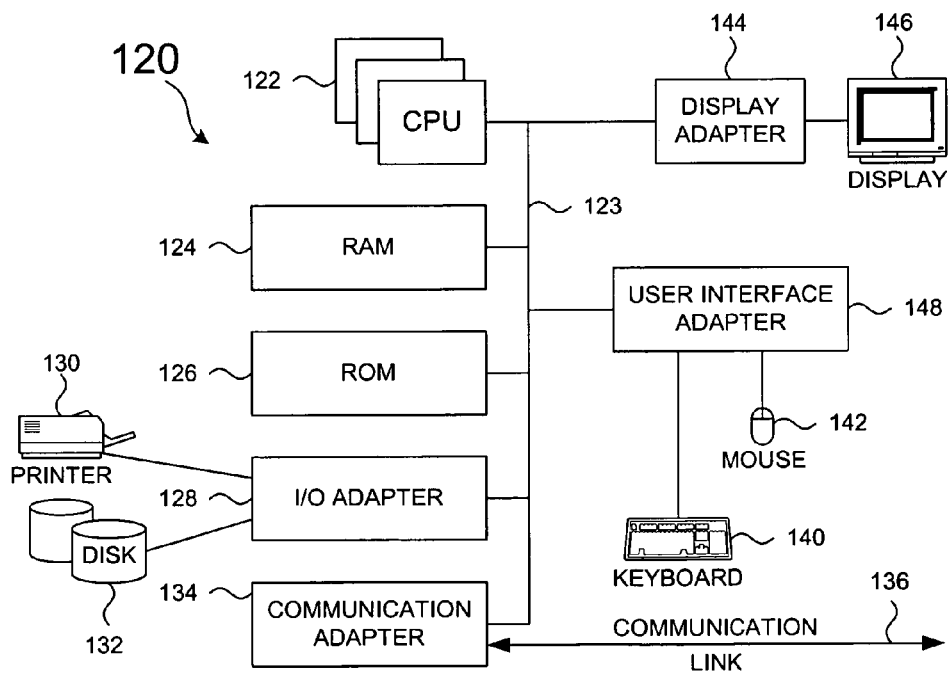
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a sound system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors and one or more types of non-volatile memory. Other peripheral devices may be used in addition to or in place of the hardware depicted in FIG. 1B. In other words, one of ordinary skill in the art would not expect to find similar components or architectures within a network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix™ operating system, while another device contains a simple Java™ runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to providing a method and system for using the metadata from a database in order to discover constraints associated with the database that may cause runtime errors when using the database and to enhance the capabilities of an object model so that the clients of the object model may handle the constraints that may be inherent in the database. As background, a typical relational database is described before describing the present invention in more detail.

While the present invention will be described with reference to preferred embodiments in which Java applications and Java objects are utilized, the invention is not limited to the use of the Java programming language. Rather, any programming language may be utilized with the principles of the present invention. The only requirement is that there must be some means for obtaining the structure of the relational database in the form of metadata information. For example, the present invention may be implemented using Microsoft Open Database Connectivity (ODBC). The ODBC driver provides links to such server/client database systems as Oracle and SQL Server and to desktop database systems such as dBASE and FoxPro.

The present invention may be implemented either at a server device or at a client device. In other words, the data representations of objects may be manipulated either on the client or the server. For example, if the system makes use of a traditional client/server application, the present invention may be implemented at the client device. If the system makes use of a three-tier application, the present invention may be implemented at a server. Furthermore, the client and server devices may be implemented as client and server processes on the same physical device. Thus, with regard to the descriptions of the preferred embodiments herein, client and server may constitute separate remote devices or the same device operating in two separate capacities. Thus, the application tools according to the present invention may be stored in local memory, executed by a device's processor, and use the device's network connections.

Figure 2:
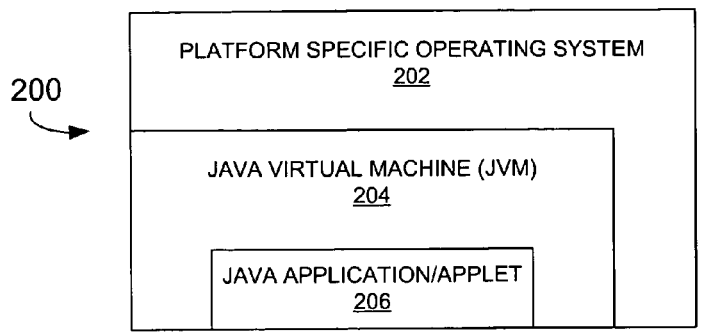
FIG. 2 is a block diagram that illustrates the relationship of typical software components within a computer system that may implement the present invention.

With reference now to FIG. 2, a block diagram illustrates the relationship of typical software components operating within a computer system that may implement the present invention. Java-based system 200 contains platform specific operating system 202 that provides hardware and system support to software executing on a specific hardware platform. JVM 204 is one software application that may execute in conjunction with the operating system. JVM 204 provides a Java run-time environment with the ability to execute Java application or applet 206, which is a program, servlet, or software component written in the Java programming language. The computer system in which JVM 204 operates may be similar to data processing system 120 described above. However, JVM 204 may be implemented in dedicated hardware on a so-called Java chip, Java-on-silicon, or Java processor with an embedded picoJava core.

JVM 204 is the center of a Java run-time environment and supports all aspects of the Java environment, including its architecture, security features, mobility across networks, and platform independence. JVM 204 is a virtual computer that executes Java programs. JVM 204 is, in essence, a computer that is specified abstractly. The JVM loads class files and executes the bytecodes within them. The various Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

In the preferred embodiment, Java Database Connectivity (JDBC) application interfaces are used to communicate with the relational database. JDBC application interfaces are application interfaces that are used to access heterogeneous databases in a transparent manner. The Java Database Connectivity (JDBC) kit was developed for Java to allow programmers to connect to a database and query it or update it using the Structured Query Language (SQL). JDBC can be used in both Java applications and applets. These applications and applets can be implemented as a traditional client/server program, as shown in FIG. 3A, or as a three-tier application as shown in FIG. 3B.

Figure 3A:
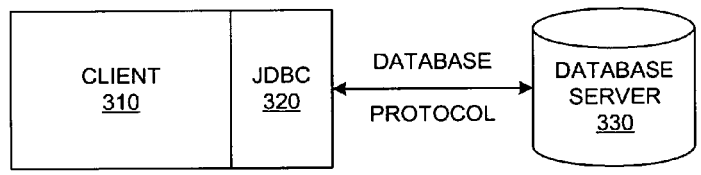
FIGS. 3A and 3B are diagrams illustrating exemplary data paths taken by requests and commands to use information stored in a relational database resident on a database server.
Figure 3B:
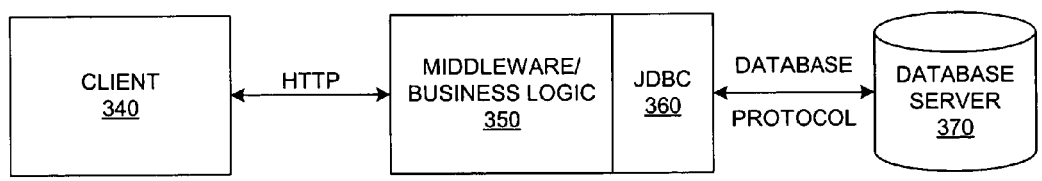

With reference now to FIGS. 3A and 3B, diagrams illustrate exemplary data paths taken by requests and commands to store object-oriented data in a relational database resident on a database server. As shown in FIG. 3A, in a traditional client/server program, client 310 uses JDBC 320 to establish a communication connection with the database server 330 using a database protocol. In a three-tier application as shown in FIG. 3B, client 340 does not make database calls. Instead, the client 340 calls on a middleware layer 350 on the server that in turn makes the database queries using JDBC 360.

The three-tier model separates the visual presentation from the business logic, i.e. the Java applications, and the raw data in the database 370. Therefore, it becomes possible for the same data and same business rules to be accessed from multiple clients. Communication between client 340 and middleware 350 can occur by using various protocols such as HTTP (Hypertext Transport Protocol), RMI (Remote Method Invocation), and the like. Communication between middleware 350 and database server 370 occurs using JDBC 360 and a database protocol. The present invention is equally applicable to either the client/server or the three-tier structure shown in FIGS. 3A and 3B. For purposes of illustration, it will be assumed with regard to the embodiments described herein that the traditional client/server structure is utilized.

Figure 4:
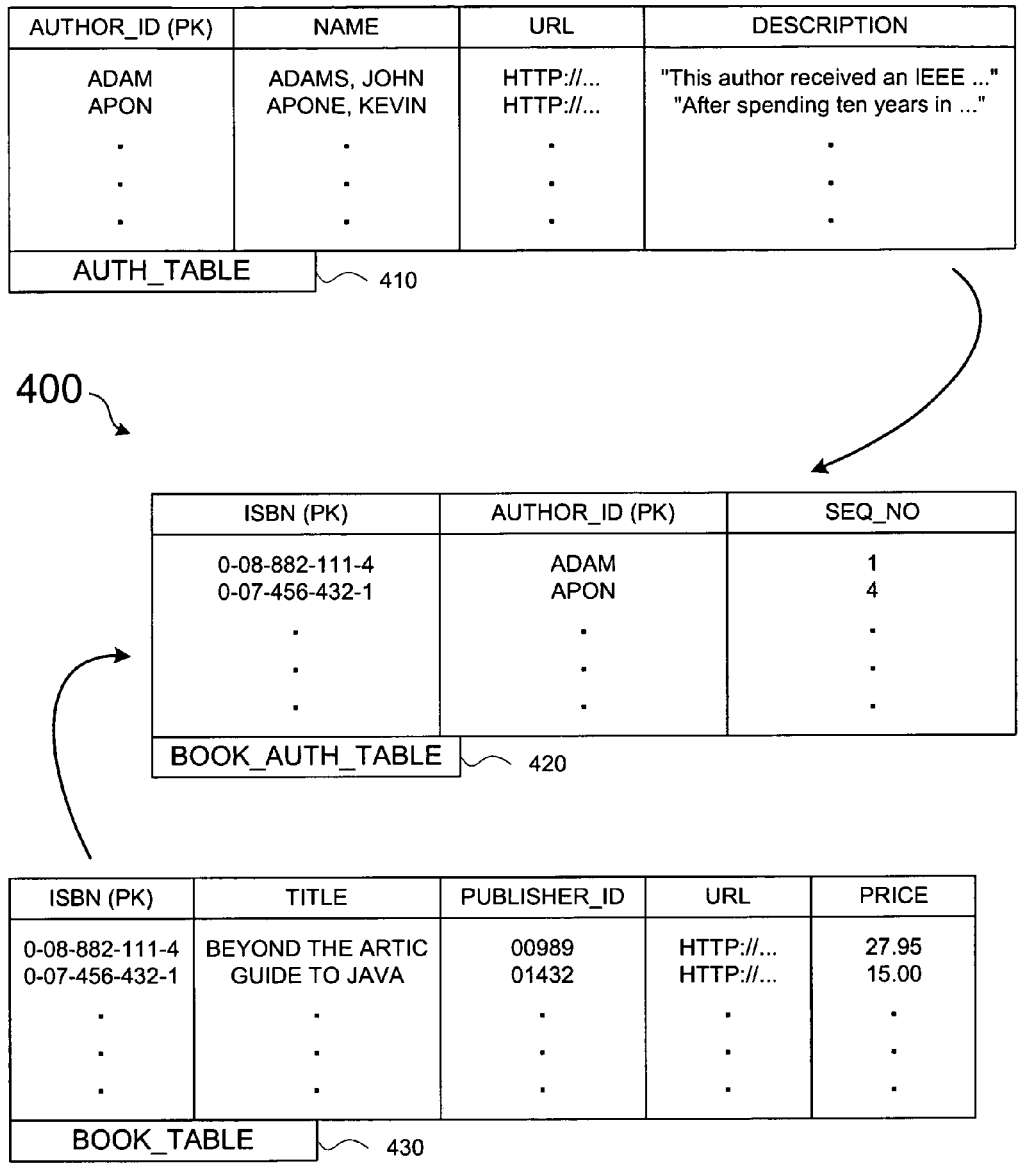
FIG. 4 is an exemplary diagram illustrating a relational database.

With reference now to FIG. 4, exemplary tables illustrate a simplified relational database in which object data is stored. The relational database is utilized in an object-relational system, i.e. a system in which applications operate on objects which are mapped to the corresponding data representations, i.e. records, in tables of a relational database. As shown in FIG. 4, the relational database is comprised of a plurality of tables 410–430 which are linked based on common attributes shown as columns in the tables.

Table 410 includes information identifying authors. The table 410 includes such information as the author identification, the author's name, and a uniform resource locator (URL) associated with the author. The author record is a data representation of an author object that may be utilized by a Java application.

The primary key (PK) of the table 410 (AUTH_TABLE) is the author identifier, or AUTHOR_ID. The primary key is the attribute that uniquely identifies a record in the table. Thus, the AUTHOR_ID in table 410 is the primary key since multiple authors may have the same name but will have different AUTHOR_IDs.

Table 430 (BOOK_TABLE) includes information identifying books. The table 430 includes such information as the TITLE of the book, the ISBN, the PUBLISHER_ID, an associated URL, and a PRICE for the book. The primary key for the records in the table 430 is the ISBN since this attribute uniquely identifies a book in the table 430. "ISBN" stands for "International Standard Book Number" and is a unique ten digit number assigned to each published book in many countries.

Table 420 (BOOK_AUTH_TABLE) includes information identifying book authors. The table 420 includes such information as the ISBN of the book(s) authored by the author, the author's AUTHOR_ID, and a Seq_No (sequence number). for the author. This information shows the authors for a specific book as well as the books authored by a specific author. It represents an intersection entity that maps the many-many relationship between authors and books. The primary key for the records in table 420 is combination of the (AUTHOR_ID, ISBN) pair which uniquely identifies each record. In addition, table 420 includes the foreign keys Author_ID from table 410 (AUTH_TABLE) and ISBN from table 430 (BOOK_TABLE). A foreign key is a primary key of one table that is present in another table. The tables 410–420–430 are linked by way of their primary and foreign keys.

Thus, based on the primary and foreign keys of the tables 410–420–430, the book-author object data in table 420 may not exist independently of the author object data in table 410 or the book object data in table 430. In other words, the primary key (Author_ID) of the table 410, i.e. a foreign key in table 420, is a proper subset of the primary key of table 420. Similarly, the primary key (ISBN) of the table 430 is also a proper subset of the primary key of table 420. A foreign key is a "proper subset" of the primary key if the foreign key includes some or all of the primary keys of the table. Therefore, if an object in table 410 is to be deleted, such as the author "Adams, John", the book author object data corresponding to "Adams, John" in table 420 must be deleted also.

The JDBC kit (APIs) provides a mechanism for providing information about the structure of a relational database and its tables. For example, a user can get a list of tables in a particular relational database, the column names, types of tables, and the like. This information is known as JDBC database metadata. The metadata may also include size limitations on fields and records with the database, not-nullable constraints, etc. While the JDBC kit is utilized in the descriptions of the preferred embodiments herein, it should be appreciated by those of ordinary skill in the art that the JDBC kit is only an exemplary mechanism for providing structure information of a relational database and other mechanisms may be employed without departing from the spirit and scope of the present invention. Many commercially available database products provide some manner of retrieving metadata about an implemented database.

In light of the background information provided by FIGS. 2–4 concerning an object-relational system, a detailed description of the present is hereinafter provided. The present invention enables an object model to be aware of constraints and size limits within a database that the object model is using to persist its objects. In addition, the object model can be instructed on semantic information about attributes in order to adopt policies for dealing with those constraints and limits. Instead of relaying database errors to clients of the object model, the present invention allows the object model to have more built-in intelligence for handling potential errors than could occur when the client is attempting to use the database. Additionally, the client can query the object model to learn about constraints and size limits to which the attributes of the objects in the object model have to conform.

Figures 5, 6A:
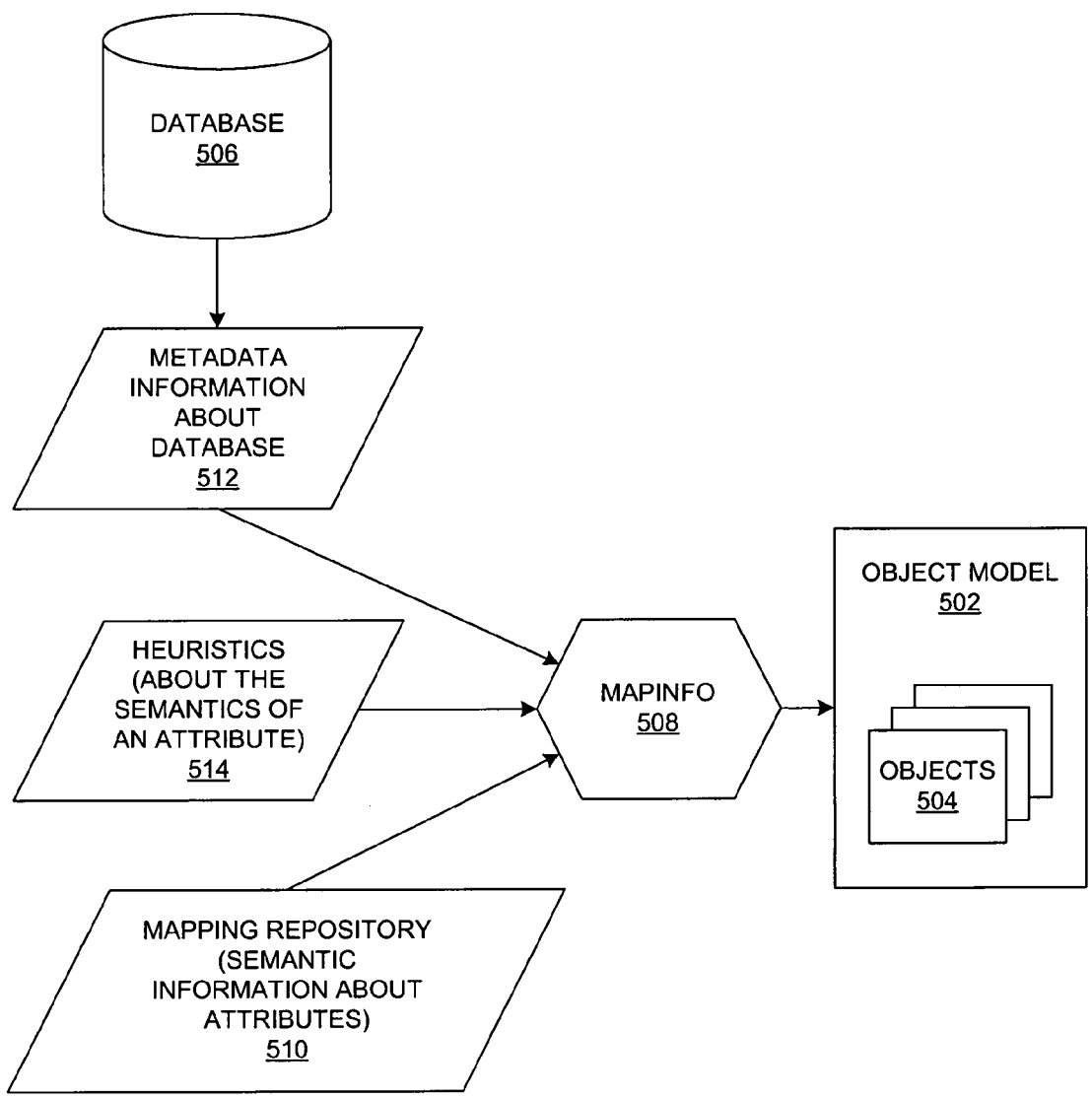

With reference now to FIG. 5, a diagram depicts the data flow between the object model, the database, and other components in accordance with a preferred embodiment of the present invention. Object model 502 contains various objects 504 that are used by clients of the object model to implement various data processing requirements within an application or applet. Database 506 is used to persist objects and their attributes in a well-known manner, such as the manner described above with respect to FIGS. 3A–3B. The remaining elements of FIG. 5 are to be interpreted in a broad, general manner with specific data and component structures described in more detail further below.

In contrast to prior art methods in which the clients of an object model remain unaware of database limitations, even though the database may have metadata available for error-avoidance processing, the present invention employs MapInfo component 508 that enables the object model to become aware of database constraints, size limits, or any other database limitation that could potentially cause runtime errors. In its broadest sense, the MapInfo component is a cache of mapping and metadata information.

MapInfo component 508 is built dynamically at object model initialization time by reading information from mapping repository 510 to obtain information about mapping objects from the object model to tables in database 506. Assuming that the database is a relational data store, the mapping repository contains information about linking attributes of objects in the classes comprising the object model to columns in the tables in the relational database. In one perspective, the mapping information consists of (Class.attribute, Table.column) pairs that provide a mapping between attributes and columns. MapInfo 508 also reads mapping repository 510 to obtain semantic information about object attributes, e.g., such as whether or not an attribute can be truncated when the attribute is stored into the database. The object model provider has the responsibility of ensuring that the mapping repository accurately reflects the links between the object model's object attributes and, assuming a relational data store, the database tables and columns. By so doing, the object model will have the most current information about the database limitations available to the clients of the object model.

MapInfo 508 also dynamically retrieves metadata information 512 about the database by querying the database for its metadata. This provides current information at runtime about the database constraints, attribute size limits, data type limits, and other database limitations.

MapInfo 508 is also responsible for reading heuristics information 514 to obtain processing rules, limitations, or permissive actions that may be performed when storing attributes in the database. In one perspective, the heuristic information can provide generic rules that may be applied to database-related actions. The heuristics may apply to a type of attribute or more generally to many types of attributes or all attributes.

For example, an attribute may have a processing limitation associated with it if such a limitation is necessary to ensure the integrity of the attribute. The processing limitation would then be stored as part of the mapping and semantic information for the attribute. If an explicit limitation is missing or is omitted in the mapping repository, then MapInfo 508 can refer to the heuristic information to obtain an applicable rule. The distinction is that the mapping repository provides information about specific attributes whereas the heuristics are more general and apply to types of attributes or the system as a whole.

As an example, if the mapping repository does not have a constraint associated with a particular attribute, such as whether or not the attribute can be truncated when it is stored, then a heuristic may provide that the attribute can be truncated as long as the attribute is not part of a primary key or a foreign key. Having such defined heuristics should reduce runtime errors within the clients of the object model. If the attribute was part of a foreign key, and the attribute was truncated when stored and then later retrieved, then the client would have the unexpected result that using the retrieved attribute to search through the primary keys in the main table would result in a failed search because the retrieved, truncated value would not match any of the primary keys.

The mapping and semantic information, the heuristic information, and the database metadata need to be available to the MapInfo component or to the object model in a manner that allows it to be accessed programmatically. In other words, each of these sets of information must be able to be interpreted or parsed by objects within the object model. The information may be formatted in a variety of manners, but these sets of information are preferably available as XML documents. For example, MapInfo 508 can receive JDBC database metadata as input and can create a markup language file describing the metadata information. These information sets may be stored as appropriate, either as separate files, in other databases, within database 506, etc.

With reference now to FIGS. 6A–6C, a set of diagrams provide mapping and semantic information, metadata information, and heuristic information for use by an object model in accordance with a preferred embodiment of the present invention. The examples shown in FIGS. 6A–6C continue the example shown in FIG. 4.

FIG. 6A shows an example of Java class 600 within the object model. Each data member within the Java "Author" class can be stored in a relational database. Hence, as should be apparent, each member of class 600 corresponds to the columns of an "AUTH_TABLE" table 410 shown in FIG. 4.

FIG. 6B shows an example of mapping and semantic information that may be stored within a mapping repository using an XML format, although other data formats could be used. Mapping and semantic information 610 defines how the object model constructs maps to the corresponding tables in the database and how the object model should process the various attributes. This information is generated, either manually or automatically, during the development of the object model and its corresponding database schema, i.e. it is statically defined. The mapping record shown in FIG. 6B is the simplified case of an object mapping to a single table. Depending upon the desired implementation, it is possible for one object to map to multiple tables, and the mapping record would reflect this accordingly.

In FIG. 4, author table 410 has columns "Author_ID", "Name", "URL", and "Description" as fields within each record in the table. Each attribute within the author table has a corresponding entry within the mapping record in FIG. 6B which provides the name of the database field as indicated by the "DBField" XML element. Associated with each database field is semantic information indicating whether or not the field is truncatable. The attribute in the object model class is identified by the "ClassField" XML element, which also specifies the data type of that attribute.

In XML terminology, each "MappingRecord" element associates a particular class in the object model, as indicated by the "classname" property associated with each "MappingRecord", with a table in the database, as indicated by the "TableName" element. Each "MappingRecord" entity has one "Attribute" element for each object attribute with an element property indicating its "Position". Each "Attribute" element then has subelements linking each object class member "ClassField" with a database column "DBField" and associated semantic information.

FIG. 6C shows metadata information for table 410 in FIG. 4 that has been retrieved from the database during runtime when the object model is instantiated. Again, depending upon the implementation and the size and number of tables, the metadata information may be more detailed. In this example, the metadata information has been formatted as an XML document. Each table entity contains elements and sub-elements with information on each record field or column within the table, such as the name of the field, its position, and its data type.

More importantly for the present invention, however, metadata information 620 contains database constraints, size limits, and other potential database limitations to be communicated to clients of the object model. In metadata information 620, each record field has an associated constraint "Nullable" that indicates whether or not an object attribute can be "NULL" when stored within the database. In addition, each field element has a sub-element "Length" that indicates the maximum length of the object attribute that may be stored within the database field, thereby providing a type of size constraint. Other constraints or limitations may be shown in a similar manner if necessary for a particular database implementation.

By comparing FIGS. 6A–6B, one can see that the names of the fields in a particular table in the database, as retrieved in metadata information 620, and the names of the attributes of the object in a specific class in the object model, as shown in class 600, are mapped together by mapping and semantic information 610. With the associations between the object attributes and the database fields provided by the mapping records, the values of the constraints and other limitations in the metadata can be easily associated with the appropriate object attributes. After the metadata is retrieved, it can be parsed to obtain the limitations, which are then cached in an appropriate manner.

Heuristics to be associated with mapping operations may be implemented in any appropriate manner. The following example is shown using pseudo-code in a rule-based language, although other programmatic formats could be used. For example, the following rule could be used:

IF (substring('desc', <attribute_name>)
THEN is_truncatable(<attribute_name>=TRUE). This rule indicates that if the attribute name that is currently being processed contains the substring "desc", then the associated database field that is currently being processed is probably a description field, and the current attribute is therefore truncatable.

The heuristic information can be viewed as policies to be adopted by the system when potential violations of database limitations may be present, and similar heuristics could provide similar types of runtime guidance. Hence, the heuristics may be operated through various types of policy management components, especially in distributed systems in which one desires to apply consistent heuristics across multiple types of databases, multiple database installations, etc.

The policies can be generic or application-specific. For example, in a generic case, a persist operation could fail because a data value that is to be stored within a database field is too long compared to the storage size of the database field. However, a heuristic can indicate that the data field stores truncatable data, e.g., a description field as shown above. In response, the responsible object within the object model can truncate the data to be stored in the field and successfully perform the persist operation without propagating the error to the user. The system may then provide some type of warning, error code, or log that this type of modification has been made.

In a more specific example, a persist operation may fail because an identifier to be used as a primary key already exists within the database. Following the previous examples, the value of an "AUTHOR_ID" may already exist within the AUTH_TABLE. In that case, there could be a rule in place that can automatically generate a new identifier to be used for the author if a different author indeed exists with the same name, as might be determinable by the full name of the author, the birth date of the author, or a combination of other fields, etc. A heuristic can indicate that in a situation in which two identifiers are identical, then a numerical postfix can be appended to the identifier, e.g., "TAYLOR01" is generated if "TAYLOR" already exists. Alternatively, if the identifier refers to the same author, as indicated by other information like the author's full name, then a rule may be in place to simply update the author information.

As another more specific example, referring again to FIG. 4, if an author record in AUTH_TABLE table 410 is to be deleted, then the associated BOOK_AUTH_TABLE records in table 420 in table also have to be deleted. However, the system may be configured to keep track of the author names provided with a book, even if other author-associated bibliographic information is not available. This might occur for various reasons in which the owner of a database has incomplete information. In this case, the AUTH_TABLE could have an additional field called DELETE_STATUS, and when a delete operation is performed on an author record in the AUTH_TABLE, a rule could be in place to simply change the value of the DELETE_STATUS field to "DELETED" instead of doing a cascade delete.

By incorporating these types of database operations through managed heuristic policies at the object model level, it should be apparent to one of ordinary skill in the art that a metadata-aware object model coupled with customizable heuristics can be quite powerful to a system that uses this type of object model.

Figure 7:
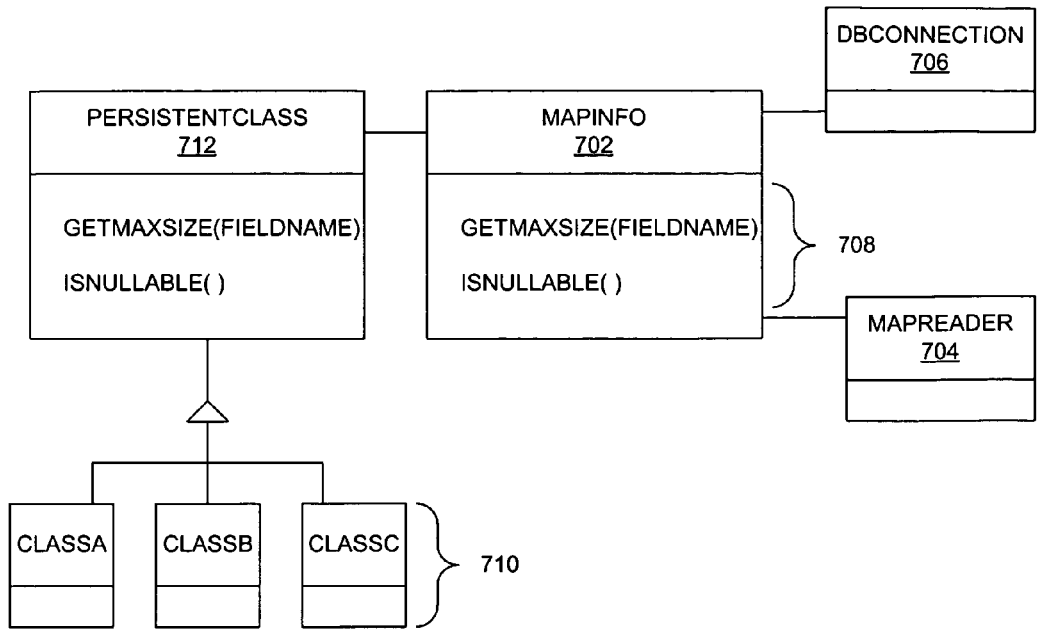
FIG. 7 is a class diagram that shows some of the relationships between some of the classes that may be used to implement the present invention.

With reference now to FIG. 7, a class diagram shows some of the relationships between some of the classes that may be used to implement the present invention. FIG. 7 shows a Unified Modeling Language (UML) diagram that describes aspects of the object model. MapInfo class 702 uses MapReader class 704 to read mapping and semantic information from a mapping repository, e.g., by reading an XML document containing the mapping information. MapInfo class 702 also uses DBConnection class 706 to query a database for metadata about tables and columns that is subsequently used to store the attributes from the objects in the object model classes in accordance with enumerated elements in the mapping repository. DBConnection class provides the ability to communicate with the database and may be similar to JDBC shown in FIGS. 3A–3B.

MapInfo class 702 then caches the information about the mappings, database constraints, and database size limits. MapInfo class 702 can now expose its services through methods that return limitation information, such as the maximum size of an attribute of a class, whether or not nulls are allowed, and whether or not attributes can be truncated. For example, MapInfo class 702 has methods 708, such as "isNullable( )" and "getMaxSize(fieldName)". The object model classes 710 are derived from PersistentClass 712 that in turn uses MapInfo class 702. The clients of the object model can query the object model classes for the database limitation information using the appropriate methods in MapInfo class 702. The classes would be changed to incorporate these new methods, i.e. the developer or programmer would add these methods to these classes. The clients would then make regular Java method invocations on these classes.

Figure 8A:
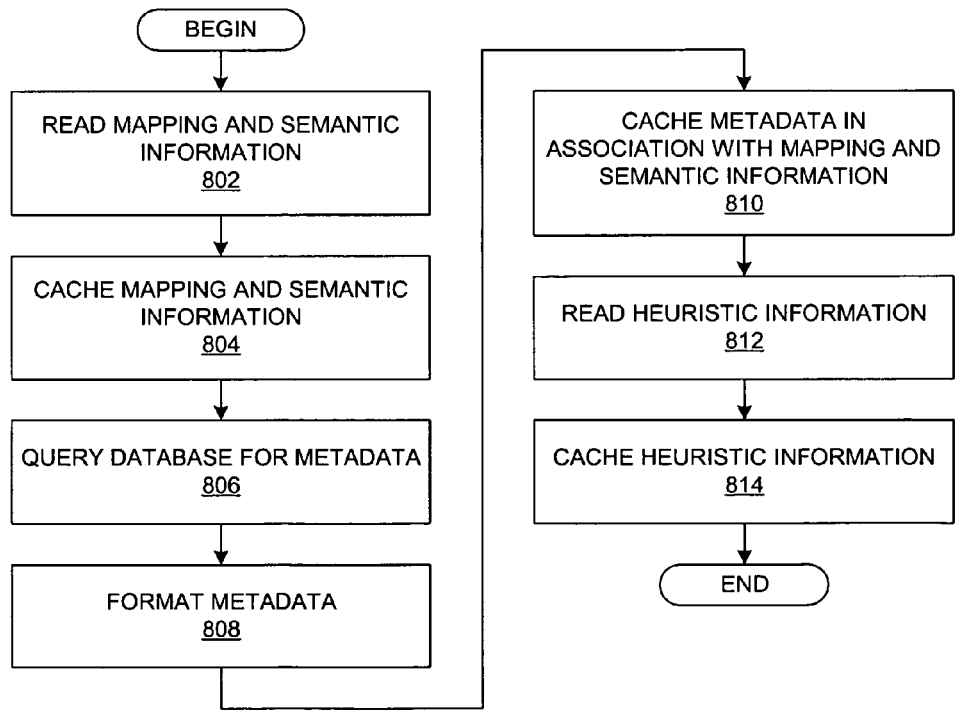
FIGS. 8A–8B are a set of flowcharts depicting the manner in which database limitations are handled in the metadata-aware object model from which object attribute data are to be persisted into the database.
Figure 8B:
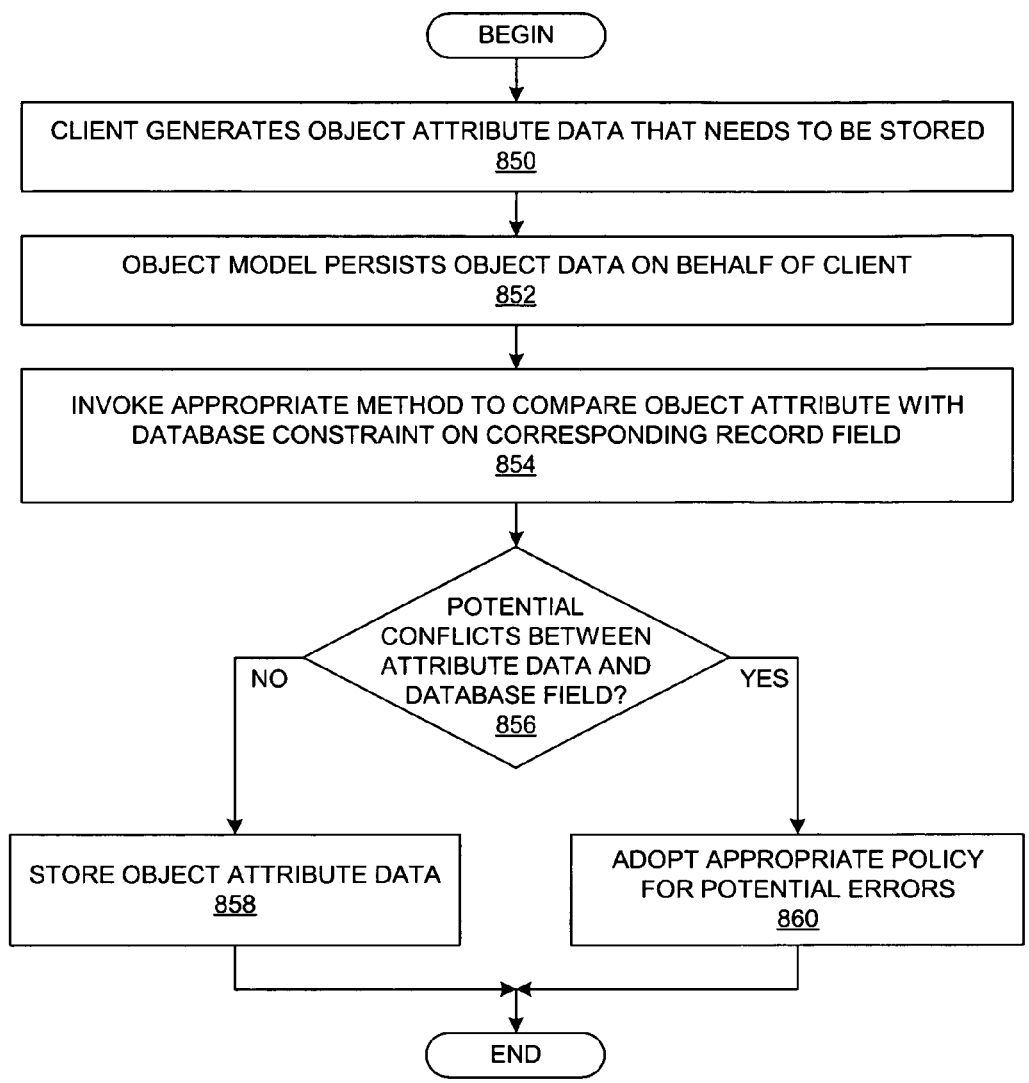

With reference now to FIGS. 8A–8B, a set of flowcharts depict the manner in which database limitations are handled in the metadata-aware object model from which object attribute data are to be persisted into the database. In the flowcharts, the metadata-aware object model can use the metadata to handle potential errors intelligently. Alternatively, the client may use the APIs as described above for using a metadata-aware object model.

FIG. 8A shows a process that is used to gather information during initialization so that database limitation information is available to clients of an object model. FIG. 8B shows a process that is used by the metadata-aware object model to handle errors when attempting to persist object state information within the database.

Referring to FIG. 8A, the process begins by reading mapping and semantic information from a mapping repository that has been built prior to runtime (step 802). This information is then cached within data structures (step 804), such as data structures within a MapInfo class as shown in FIG. 5. The database is then queried to retrieve metadata that describes the limitations of the database (step 806), such as field constraints, size limits, etc. The metadata may be optionally formatted in a manner that allows for easy information retrieval (step 808), such as elements within an XML document that can be combined with other elements from other XML documents. The metadata is then cached within data structures associated with previously cached mapping and semantic information (step 810). If heuristic information is available, then it is read from its storage location (step 812) and also cached in association with the metadata (step 814). The process of initializing the cached metadata information is then complete.

Referring to FIG. 8B, the process begins when a client of the object model has generated some object attribute data or has decided that some object attribute data should be persisted (step 850). The object model then persists object data on behalf of the client (step 852). During the persistence operation, the object model invokes an appropriate method associated with the object's class to discover any limitations that exist at the database end that may potentially cause an error when other database-related methods are invoked to store the object attribute (step 854). Preferably, the object model intelligently handles this error when it persists the object data on the client's behalf. A determination is then made as to whether or not any potential conflicts exist between the actual object attribute data and any limitations in a corresponding database field (step 856). If not, then the object attribute data may be stored in the database by calling the appropriate database engine methods, etc. (step 858). If it is determined that there are conflicts, then the object model can adopt appropriate policies for dealing with the situation (step 860), which may include selecting an appropriate policy or further action as provided by previously cached heuristics. The process within the object model for persisting the object attributes within the database is then complete.

The advantages of the present invention should be apparent in view of the detailed description of the invention that is provided above. In the prior art, clients of an object model might confront uninterpretable errors when storing objects in a database. In the present invention, metadata is obtained from a database and provided to the object model that uses the database for persisting the state of its objects. The metadata provides the object model with constraints, size limits, or other limiting information about a database so that the object model can anticipate and handle potential errors that could occur at the database level. Rather than keeping the metadata embedded within the database, the object model obtains access to the metadata and can adopt policies for dealing with those constraints and limits. In addition, the object model is also provided with heuristics that can be applied to storage processing of attributes. In this manner, the object model becomes metadata-aware and can handle database operations more intelligently and thus propagate fewer errors to the client.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for storing object attribute data in a database, the method comprising the steps of:
   retrieving metadata from the database, wherein the metadata indicates database limitations;
   retrieving semantic information from a mapping repository, wherein the semantic information indicates a manner in which object attribute data is stored in the database; and
   storing object attribute data in the database according to the semantic information and the metadata.

2. The method of claim 1 wherein the database limitations are selected from a group comprising record constraints, field constraints, and/or size limits.

3. The method of claim 1 further comprising:
   storing the metadata using markup language to identify the metadata.

4. The method of claim 1 wherein the semantic information provides a mapping between object attributes and records in a relational database.

5. The method of claim 1 further comprising:
   storing the semantic information using markup language to identify the semantic information.

6. The method of claim 1 further comprising:
   determining whether or not the object attribute data has characteristics that conflict with the database limitations indicated within the retrieved metadata; and
   in response to a determination that the object attribute data has characteristics that conflict with the database limitations, modifying the object attribute data so that the object attribute data does not have characteristics that conflict with the database limitations.

7. The method of claim 1 comprising:
   retrieving heuristic information; and
   modifying the object attribute data in accordance with the heuristic information if the object attribute data has characteristics that conflict with the database limitations.

8. The method of claim 1 wherein the metadata and the semantic information are retrieved during an initialization phase of an object model that uses the metadata on behalf of a client of the object model.

9. The method of claim 1 comprising:
   retrieving heuristic information, wherein the heuristic information and the metadata are cached within an object model; and
   modifying the object attribute data within the object model on behalf of a client in accordance with the heuristic information if the object attribute data has characteristics that conflict with the database limitations such that the modified object attribute data can be stored into the database without error.

10. A method for storing object attribute data in a database, the method comprising the steps of:
    retrieving metadata from the database, wherein the metadata indicates database limitations;
    retrieving semantic information from a mapping repository, wherein the semantic information indicates a manner in which object attribute data is stored in the database;
    retrieving heuristic information, wherein the heuristic information and the metadata are cached within an object model;
    modifying the object attribute data within the object model on behalf of a client in accordance with the heuristic information if the object attribute data has characteristics that conflict with the database limitations; and
    storing the modified object attribute data in the database.

11. An apparatus for storing object attribute data in a database, the apparatus comprising:
    first retrieving means for retrieving metadata from the database, wherein the metadata indicates database limitations;
    second retrieving means for retrieving semantic information from a mapping repository, wherein the semantic information indicates a manner in which object attribute data is stored in the database; and
    storing means for storing object attribute data in the database according to the semantic information and the metadata.

12. The apparatus of claim 11 wherein the database limitations are selected from a group comprising record constraints, field constraints, and/or size limits.

13. The apparatus of claim 11 further comprising:
    storing the metadata using markup language to identify the metadata.

14. The apparatus of claim 11 wherein the semantic information provides a mapping between object attributes and records in a relational database.

15. The apparatus of claim 11 further comprising:
    storing the semantic information using markup language to identify the semantic information.

16. The apparatus of claim 11 further comprising:
    determining means for determining whether or not the object attribute data has characteristics that conflict with the database limitations indicated within the retrieved metadata; and
    first modifying means for modifying, in response to a determination that the object attribute data has characteristics that conflict with the database limitations, the object attribute data so that the object attribute data does not have characteristics that conflict with the database limitations.

17. The apparatus of claim 11 comprising:
    third retrieving means for retrieving heuristic information; and
    second modifying means for modifying the object attribute data in accordance with the heuristic information if the object attribute data has characteristics that conflict with the database limitations.

18. The apparatus of claim 11 wherein the metadata and the semantic information are retrieved during an initialization phase of an object model that uses the metadata on behalf of a client of the object model.

19. The apparatus of claim 11 comprising:
    retrieving means for retrieving heuristic information, wherein the heuristic information and the metadata are cached within an object model; and
    modifying means for modifying the object attribute data within the object model on behalf of a client in accordance with the heuristic information if the object attribute data has characteristics that conflict with the database limitations such that the modified object attribute data can be stored into the database without error.

20. A computer program product in a computer readable medium for use in a data processing system for storing object attribute data in a database, the computer program product comprising:
- instructions for retrieving metadata from the database, wherein the metadata indicates database limitations;
- instructions for retrieving semantic information from a mapping repository, wherein the semantic information indicates a manner in which object attribute data is stored in the database; and
- instructions for storing object attribute data in the database according to the semantic information and the metadata.

21. The computer program product of claim 20 wherein the database limitations are selected from a group comprising record constraints, field constraints, and/or size limits.

22. The computer program product of claim 20 wherein the semantic information provides a mapping between object attributes and records in a relational database.

23. The computer program product of claim 20 further comprising:
- instructions for determining whether or not the object attribute data has characteristics that conflict with the database limitations indicated within the retrieved metadata; and
- instructions for modifying, in response to a determination that the object attribute data has characteristics that conflict with the database limitations, the object attribute data so that the object attribute data does not have characteristics that conflict with the database limitations.

24. The computer program product of claim 20 comprising:
- instructions for retrieving heuristic information; and
- instructions for modifying the object attribute data in accordance with the heuristic information if the object attribute data has characteristics that conflict with the database limitations.

25. The computer program product of claim 20 wherein the metadata and the semantic information are retrieved during an initialization phase of an object model that uses the metadata on behalf of a client of the object model.

26. The computer program product of claim 20 comprising:
- instructions for retrieving heuristic information, wherein the heuristic information and the metadata are cached within an object model; and
- instructions for modifying the object attribute data within the object model on behalf of a client in accordance with the heuristic information if the object attribute data has characteristics that conflict with the database limitations such that the modified object attribute data can be stored into the database without error.

27. A computer program product in a computer readable medium for use in a data processing system for storing object attribute data in a database, the computer program product comprising:
- instructions for retrieving metadata from the database, wherein the metadata indicates database limitations;
- instructions for retrieving semantic information from a mapping repository, wherein the semantic information indicates a manner in which object attribute data is stored in the database;
- instructions for retrieving heuristic information, wherein the heuristic information and the metadata are cached within an object model;
- instructions for modifying the object attribute data within the object model on behalf of a client in accordance with the heuristic information if the object attribute data has characteristics that conflict with the database limitations; and
- instructions for storing the modified object attribute data in the database.

* * * * *